United States Patent [19]

Fehrenbach et al.

[11] Patent Number: 4,679,537

[45] Date of Patent: Jul. 14, 1987

[54] DAMPING DEVICE

[75] Inventors: Siegfried Fehrenbach, Markgröningen; Kurt Herbst, Burgstetten; Wolfgang Schulz, Bietigheim-Bissingen; Eberhard Utz, Stuttgart, all of Fed. Rep. of Germany

[73] Assignee: Robert Bosch GmbH, Stuttgart, Fed. Rep. of Germany

[21] Appl. No.: 800,568

[22] Filed: Nov. 21, 1985

[30] Foreign Application Priority Data

Dec. 19, 1984 [DE] Fed. Rep. of Germany ....... 3446324

[51] Int. Cl.[4] .............................................. F16L 55/04

[52] U.S. Cl. ....................................... 123/447; 138/30

[58] Field of Search ........................ 123/447, 468, 469; 138/26, 30, 31, 39

[56] References Cited

U.S. PATENT DOCUMENTS 1,796,126 3/1931 Smith .................................. 138/30

3,891,151 6/1975 Showalter ........................ 138/30 X 4,205,637 6/1980 Ito et al. ............................. 123/447

4,514,151 4/1985 Anders et al. .................... 138/30 X

*Primary Examiner*—Stephen Marcus

*Assistant Examiner*—Mark Thronson

*Attorney, Agent, or Firm*—Edwin E. Greigg

[57] ABSTRACT

A damping device is proposed, which serves to equalize and reduce pressure fluctuations arising in fuel supply systems for internal combustion engines in motor vehicles. The damping device includes a damper element which has at least one damper diaphragm fastened in a damper housing and is arranged to define a fuel chamber which communicates via a feed pipe with a fuel distributor line. The feed pipe is oriented toward a flow tube which communicates with a fuel supply line and protrudes into the fuel distributor line. The fuel chamber of the damper element communicates via a further feed pipe with the fuel distributor line. The feed pipe and the flow tube are axially spaced apart from one another by a distance (A).

13 Claims, 3 Drawing Figures

DAMPING DEVICE

BACKGROUND OF THE INVENTION

The invention is based on a damping device as generally defined hereinafter. A damping device has already been proposed in which the damper element has a feed pipe which engages a flow tube that pierces a fuel distributor line and communicates with a fuel supply line; between itself and the flow tube, the feed pipe forms a flow cross section with respect to the fuel distributor line. The disadvantage here, however, is that in order to save weight and space, the flow cross section between the feed pipe and the flow tube is kept relatively small, so that the damper element does not adequately damp both pressure fluctuations in the fuel distributor line, which are caused by pressure pulses in the injection valve, and pressure fluctuations originating in the fuel supply line, which are caused by the fuel feed pump.

OBJECT AND SUMMARY OF THE INVENTION

The damping device according to the invention has the advantage over the prior art that the damper element is simple to assemble with the fuel distributor line and together with the fuel distributor line is simple in structure; meanwhile little space is required to install the damper element, and both pressure fluctuations in the fuel distributor line and in the fuel supply line are damped.

Not only is it advantageous to join the feed pipe to the damper housing in order to facilitate assembly, but a further advantage is attained if the feed pipe is molded integrally on the damper housing. A particularly simple embodiment is attained if the damper housing and the fuel distributor line ar soldered together, because then seals and screws can be dispensed with.

A further advantage is that one feed pipe and the flow tube are axially spaced apart from one another, so that although fuel pressure fluctuations arising in the flow tube do act directly upon the damper element, not all the fuel flowing in via the flow tube has to flow into the damper.

The invention will be better understood and further objects and advantages thereof will become more apparent from the ensuing detailed description of a preferred embodiment taken in conjunction with the drawings.

DESCRIPTION OF THE PREFERRED EMBODIMENTS

Figure 1:
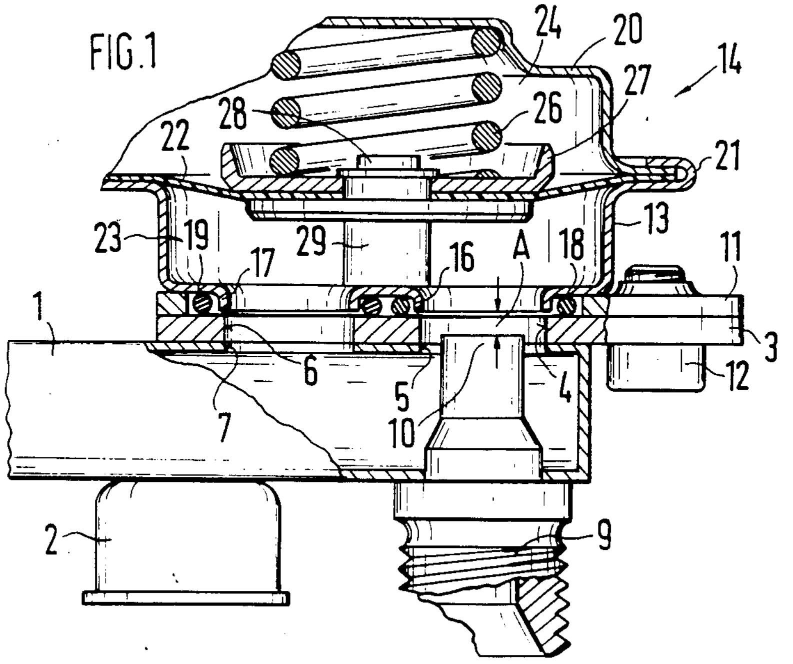
FIG. 1 shows generally in cross-section a first exemplary embodiment of a damping device according to the invention.

In FIG. 1, reference numeral 1 indicates a rigid fuel distributor line, made for instance of metal, of a fuel injection system for internal combustion engines. The fuel distributor line has a plurality of plug connections 2, into which one end of fuel injection valves are inserted. A fastening flange 3 is joined, for instance by soldering, to the wall of the fuel distributor line 1, and a first flow opening 4, which coincides with a first opening 5 in the fuel distributor line 1, and a second flow opening 6, which coincides with a second opening 7 in the fuel distributor line 1, are provided in the fastening flange 3. The openings 5 and 7 in the fuel distributor line are located along the longitudinal axis of the fuel distributor line 1, spaced apart axially from one another. In alignment with the first opening 5 of the fuel distributor line 1, a flow tube 9 originating on the side of the fuel distributor line 1 opposite the first opening 5 at least partially pierces the fuel distributor line 1 and may optionally project so far as to extend into the first flow opening 4 of the fastening flange 3. The flow tube 9 communicates with a fuel supply line, not showh, which is connected to the supply outlet of a fuel feed pump (not shown) that pumps in a pulsating manner. When the flow pipe 9 projects into the first opening 5, the end 10 of the flow tube 9 that protrudes into the first opening 5 has a substantially smaller diameter than the first opening 5, so that between the circumference of the flow tube 9 at the end 10 and the first opening 5 or the first flow opening 4, fuel can flow unrestricted and freely into an annular cross section.

Remote from the fuel distributor line 1, a fastening flange 11 rests on the fastening flange 3 and the two flanges are joined with screws 12. The fastening flange 11 is in turn secured to a bottom part 13 of a damper element 14, for instance by soldering. In the bottom part 13, a first feed pipe 16 and a second feed pipe 17 are molded in such a way that they project from the bottom part 13, in fact such that when the fastening flange 11 and the fastening flange 3 are screwed together, the first feed pipe 16 is arranged to coincide with the first flow opening 4 or the first opening 5, and the second feed pipe 17 comes to coincide with the second flow opening 6 or the second opening 7. Seals in the form of seals 18, 19 are placed about the necks of feed pipes 16, 17, effecting sealing off and preventing leakage from the outside between the fastening flange 3 and the bottom part 13. Between the bottom part 13 and a lid 20 of the damper element 14, a resilient damper diaphragm 22 is fastened by means of a crimped edge 21, and in the damper element 14 the diaphragm 22 divides a fuel chamber 23, which communicates with the feed pipes 16, 17, from a damper chamber 24. A compression spring 26 is disposed in the damper chamber 24 and is supported at one end on the lid 20 and on the other on a spring support plate 27, which is secured to the damper diaphragm 22 by means of a rivet connection 28 which passes in a sealed manner through the damper diaphragm 22. The rivet connection 28 has a stop bolt 29 protruding into the fuel chamber 23, and at a predetermined allowable flexing of the damper diaphragm 22 this stop bolt 29 comes to rest on the inner wall of the bottom part 13. As a result, overstretching of the damper diaphragm 22 by the compression spring 26 in the pressureless state is avoided.

The inside diameters of the openings 5, 7, the flow openings 4, 6 and the feed pipes 16, 17 are selected to be as large as possible, so as to enable a free flow of fuel and an unhindered propagation of pressure fluctuations into the fuel chamber 23 of the damper element 14. The first feed pipe 16 and the flow tube 9 are spaced apart axially from one another by a distance A, so that fuel flowing in via the flow tube 9 does not have to flow exclusively into the fuel chamber 23, but rather can also, after it emerges from the flow tube 9, flow via the annular flow cross section between the circumference of the flow tube and the first flow opening 4 and the first opening 5 into the fuel distributor line 1. By means of the embodiment according to the invention, both pulsations of the fuel that are caused by the fuel feed pump and pulsations arising from the opening and closing of the fuel injection valves, which reach the fuel chamber 23 through the fuel distributor line 1, are damped.

Figure 2:
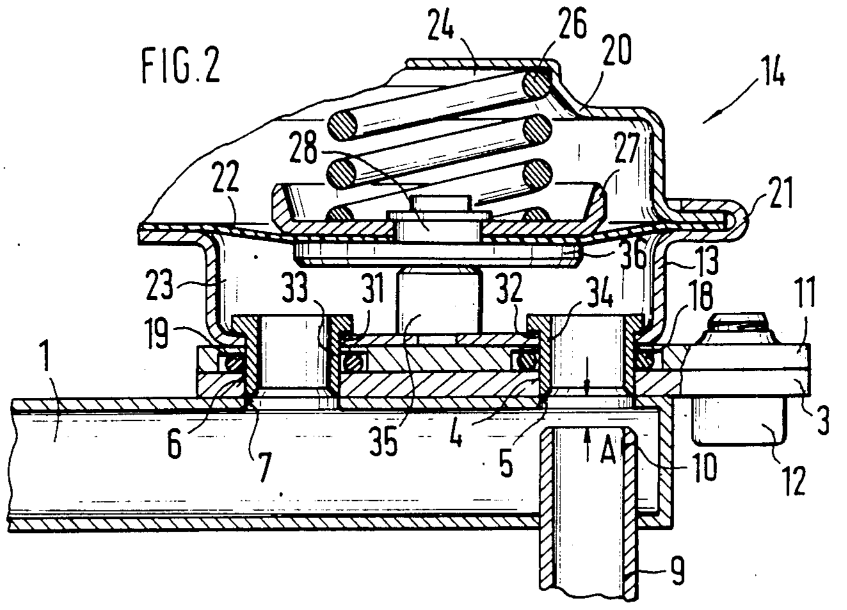
FIG. 2 shows a further cross-sectional view of a second exemplary embodiment of a damping device according to the invention.

In the second exemplary embodiment of a damping device shown in FIG. 2, elements remaining the same as and functioning like those in the exemplary embodiment of FIG. 1 are identified by the same reference numerals. Differing from the embodiment of FIG. 1, the bottom part 13 of the damper element 14 of FIG. 2 has insertion openings 31 and 32, into which tubular feed pipes 33 and 34 are inserted and joined with the bottom part, for instance by soldering. The feed pipes 33 and 34 protrude out from the bottom part 13 and may extend, for instance, as far as into the flow openings 4, 6 of the fastening flange 11. The end 10 of the flow tube 9 and the feed pipe 34 are oriented approximately in alignment with one another and are axially spaced apart from one another by an axial distance A, with the end 10 of the flow tube 9 terminating inside the fuel distributor line 1, so that a portion of the fuel flowing in via the flow tube 9 can immediately flow into the fuel distributor line 1. The distance A amounts to approximately 2 to 5 mm. A stop bolt 35 is joined to the bottom part 13 on one end, and on the other end it is oriented toward a stop plate 36 of the rivet connection 28 on the damper diaphragm 22, so that the movement of the damper diaphragm 22 in the direction toward the feed pipes 33, 34 is limited by the stop bolt 35. The feed pipes 33, 34 form sufficiently large cross sections so that pressure pulsations coming from the fuel distributor line 1 and from the flow tube 9 are rapidly deviated to the fuel chamber 23 and cancelled out.

Figure 3:
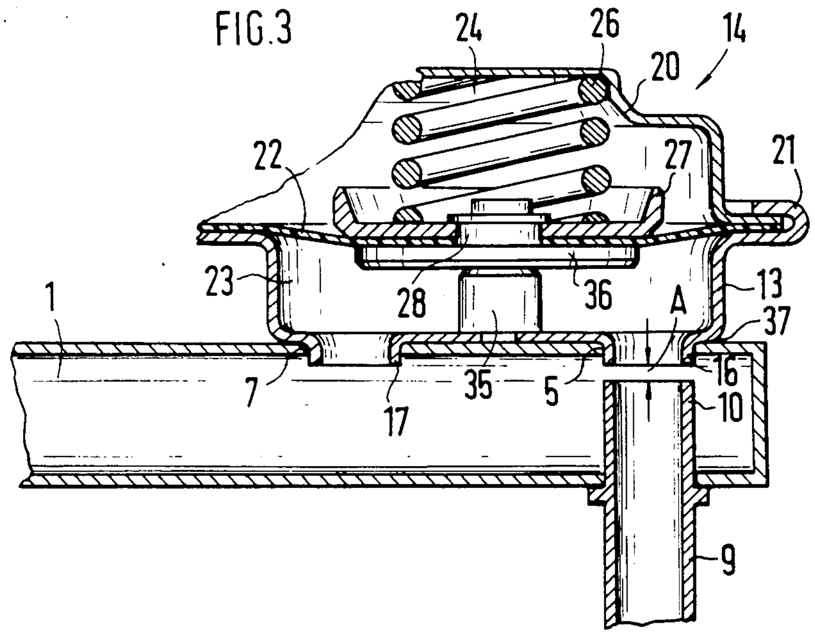
FIG. 3 shows in cross-section a third exemplary embodiment of a damping device according to the invention.

In the third exemplary embodiment shown in FIG. 3, the elements that are the same as and function like those in the foregoing embodiments of FIGS. 1 and 2 again have the same reference numerals. Differing from the foregoing embodiments, in the embodiment of FIG. 3 the securing flanges 3, 11 and the screws 12 are lacking. The feed pipes 16, 17 formed onto the bottom part 13, or the feed pipes 33, 34 joined to the bottom part 13, protrude directly into the openings 5, 7 of the fuel distributor line 1 in the third exemplary embodiment of FIG. 3. Moreover, the bottom part 13 is soldered to the fuel distributor line 1 at 37 in the resultant plane between these two parts [i.e., between 1 and 13] in such a way that a fuel-tight connection is brought about between the surfaces of the fuel distributor line 1 and of the bottom part 13.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. A damping device comprising a damper element, a rigid fuel distributor line which distributes fuel to fuel injection valves of a fuel injection system for internal combustion engines, said damper element disposed on said rigid fuel distributor line and comprises at least one damper diaphragm fastened in a damper housing, said damper diaphragm further adapted to define a fuel chamber in said damper housing below said diaphragm and a damping chamber above said damper diaphragm, at least two flow openings extending from said fuel chamber to said fuel distributor line, a flow tube extending into said fuel distributor line in spaced relation with at least one flow opening in axial alignment therewith, said flow tube communicates with a fuel supply line connected to supply an outlet of a fuel feed pump and with said fuelchamber of said damper element via said at least one flow opening for supplying fuel to said rigid fuel distributor line.

2. A damping device as defined by claim 1, which includes a feed pipe in each of said flow openings wherein each said feed pipe communicates wit said damper housing.

3. A damping device as defined by claim 2, further wherein each said feed pipe is integral with said damper housing.

4. A damping device as defined by claim 2, further wherein each said feed pipe is provided with seal means, said seal means disposed between said damper housing and said fuel distributor line.

5. A damping device as defined by claim 3, further wherein each said feed pipe is provided with seal means, said seal means disposed between said damper housing and said fuel distributor line.

6. A damping device as defined by claim 1, further wherein said damper element and said fuel distributor line are joined by threaded means.

7. A damping device as defined by claim 2, further wherein said damper element and said fuel distributor line are joined by threaded means.

8. A damping device as defined by claim 3, further wherein said damper element and said fuel distributor line are joined by threaded means.

9. A damping device as defined by claim 4, further wherein said damper element and said fuel distributor line are joined by threaded means.

10. A damping device as defined by claim 3, further wherein each said feed pipe protrudes into an opening in said fuel distributor line and said damper housing is soldered to said fuel distributor line.

11. A damping device as defined by claim 1, further wherein said flow opening in axial alignment with said flow tube comprises a first element which is spaced axially from said flow tube by a distance (A).

12. A damping device as defined by claim 3, further wherein said flow opening in axial alignment with said flow tube comprises a first element which is spaced axially from said flow tube by a distance (A).

13. A damping device as defined by claim 6, further wherein said flow opening in axial alignment with said flow tube comprises a first element which is spaced axially from said flow tube by a distance (A).

* * * * *